Jan. 12, 1932.    A. E. YOUNG    1,840,826
MEASURING APPARATUS
Filed March 21, 1930    2 Sheets-Sheet 2
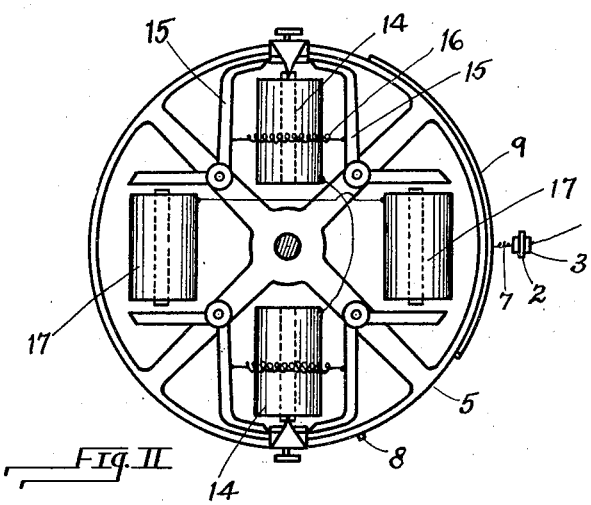
Fig. II
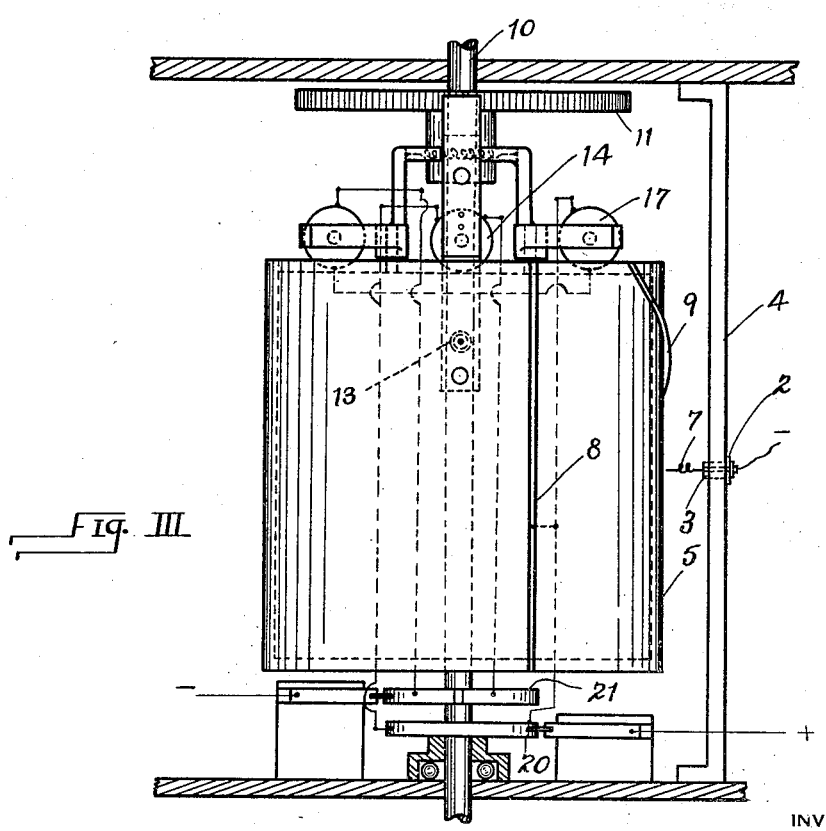
Fig. III
INVENTOR
Archer E. Young
by Christy Christy and Wharton
his attorneys Patented Jan. 12, 1932

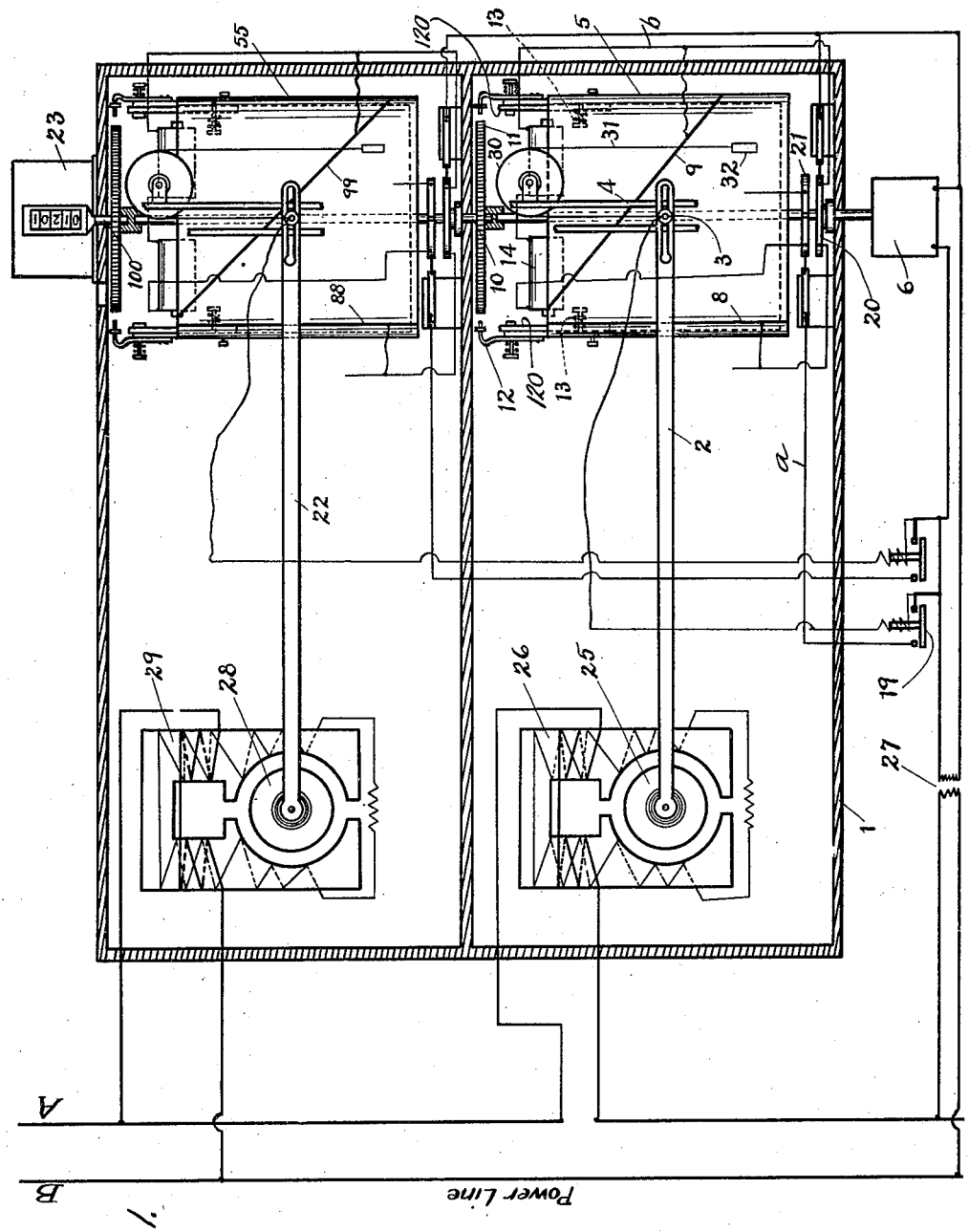

1,840,826

UNITED STATES PATENT OFFICE

ARCHER E. YOUNG, OF PITTSBURGH, PENNSYLVANIA

MEASURING APPARATUS

Application filed March 21, 1930. Serial No. 437,697.

This invention relates to measuring apparatus and consists in improvements in structure of an instrument for aggregating the quantity of a variable over an interval of time. The instrument here chosen for illustration is an instrument for aggregating through a prolonged interval of time the electric energy which is drawn from power lines, and specifically the instrument is a watt meter. Its general applicability to measuring instruments generally built upon the same lines and operating upon like principles will be understood.

In the accompanying drawings Figure I is a view, partly in vertical section and partly in side elevation, of a watt meter embodying my invention. This figure is in part diagrammatic, as will hereinafter appear. Figure II is a view to larger scale, showing in end elevation a rotary member which forms a part of the organization of Figure I. And Figure III is a fragmentary view in section showing in side elevation the same rotary member, with greater elaboration of detail than appears in Figure I.

Referring to Figure I, the two branches of an electric circuit are diagrammatically indicated at A B. This circuit may, for illustration, be understood to be a power line; and the instrument of my invention may be provided in association with such a circuit, to measure and to indicate the value of the current delivered in the course of time through such circuit.

Within a suitable casing 1 two arms 2 and 22 are mounted to swing each on its own pivot point and severally in response each to a different varying condition in the current flowing in the circuit A B. One of the two said arms is by appropriate instrumentalities caused to swing in response to variation in the amperage of the current flowing in the line A B, and the other arm is by other appropriate instrumentalities caused to swing in response to variation in voltage under which the current flows in the line A B. Conveniently, these instrumentalities comprise two motors, 26 and 29, provided severally with rotatable armatures 25 and 28. The motor 26 is so connected in the line A B that the lever 2 borne by its armature 25 is in its range of swing responsive to variation in amperage, that is to say, to the strength of a current flowing in the line A B. To the armature 25 of motor 26 the arm 2 is connected; and, in consequence, the arm in its swinging is expressive of the amperage of the current. The motor 29 is so connected in the circuit that the arm borne by its armature is responsive to and expressive of variation in voltage in the current flowing in line A B. Associated with each of the arms 2 and 22 is a cylinder. The two cylinders 5 and 55 are mounted coaxially in vertical position, and the arrangement is such that the common plane in which the two arms swing is approximately tangent to the two cylinders, and that the two arms at the ends remote from their pivot points approach to approximate tangency to the two cylinders. One of the two cylinders, the cylinder 5, is constantly rotated by a motor 6. This motor may be clockwork, or it may as hereinafter explained be an electric motor. The cylinder 55 is mounted for rotation independently of the cylinder 5, but a clutch mechanism is provided which, when closed, causes cylinder 55 to rotate in unison with cylinder 5.

Each arm carries an electric contact piece or block. That contact piece carried by the arm 2 is indicated at 3. Each cylinder carries two contact strips. Those carried by the cylinder 5 are designated 8 and 9. The space interval, circumferentially of the cylinder, at which these two strips 8 and 9 stand apart, varies from point to point longitudinally of the cylinder. The contact piece or block 3 carries a brush 7, and, as the cylinder rotates, the brush 7 makes effective contact with the strips 8 and 9 in succession, and according to the position of the lever 2 in its range of swing, the interval between such successive contacts is greater or less.

A shaft 10 is mounted for rotation coaxially with cylinder 5, and the above-mentioned clutch mechanism in this case is shown to include a disk 11 secured to this shaft. Cylinder 5 carries one or more clutch members, in the form of swinging arms 12 which extend longitudinally beyond the head of the cylinder and opposite the face of disk 11. The arms may be swung to and from engagement with the disk. The face of the disk and the outer ends of the arms are suitably adapted to serve the clutch purposes indicated. To such end, the face of the disk may be serrated, and the arms may terminate in teeth adapted to enter and to be withdrawn from engagement with the serrations. Such minute shaping of the parts is indicated in the drawings. Conveniently there are two arms 12, arranged in diametrically opposite positions, on cylinder 5. Normally the arms 12 are held by springs 13 retracted and free from engagement with the disk, and from such position they are swung inwardly, against the tension of the springs, by means of electro-magnets 14. The magnets 14 are borne by cylinder 5 and are so situated that, when energized, they attract and draw the arms inward. To this end the arms 12 are formed of, or carry blocks 120 of, magnetic material.

Co-operating with the arms 12 are spring latches 15, borne also by cylinder 5. When by the energizing of electro-magnets 14 the arms 12 are swung inward to clutch-closing position, the latches 15, which under tension of springs 16 had been bearing laterally upon the sides of the arms, spring to place behind the arms, and hold them secure in clutch-closing position. A second pair of electro-magnets 17 is provided, borne also by cylinder 5, and so arranged that, when energized (in alternation with the energizing of magnets 14), they will be effective to swing the latches 15, against the tension of springs 16, from the latching position to which in consequence of the action of electro-magnets 14 they had swung, to unlatching position; and then the arms 12, freed of restraint, will swing again, under tension of their springs 13, to the position of clutch release. By such provision shaft 10 is caused to rotate in unison with the motor-driven cylinder 5, so long as the clutch is closed. When the clutch is open, shaft 10 is at rest.

The small amount of electric energy required for energizing the electro-magnets 14 and 17 may be derived from any suitable source. I have shown it to be derived, as it may as a matter of convenience be derived, from the circuit A B, through a transformer 27. A relay is indicated at 19; and collector rings 20 and 21 are indicated, borne by and insulated upon the shaft of cylinder 5. The ring 20 is complete and continuous; the ring 21 is composed of two arc-shaped parts, insulated one from the other. It should be remarked of collector ring 21 that one portion is electrically connected with the coils of magnets 14 and the other portion with the coils of magnets 17.

When in the course of cylinder rotation the brush 7 with which block 3 is equipped makes contact with strip 8, a circuit is completed which includes the secondary coil of transformer 27 and the coil of relay 19; thereupon relay 19 is operated, and then immediately current in greater strength is caused to flow from the secondary coil of the transformer by connection $a$, through ring 21 to magnets 14, and thence back through connection $b$ to ring 20 and to the transformer coil again. Thus the magnets 14 are energized and the clutch is closed. The latches 15 close automatically behind the closing clutch arms 12. The electro-magnets 14, when they have so performed their part in the operation of the instrument, become immediately de-energized again, by the advance of the block-borne brush 7 from contact with the strip 8. The clutch, however, continues in closed position, being secured by the latches 15, and shaft 10 continues to rotate in unison with cylinder 5. In the further progress of operation, the brush 7 makes contact with strip 9, the relay 19 again is closed, and again immediately an energizing current flows, this time through lead $a$ and through the alternate segment of ring 21 and electro-magnets 17. The energizing of the magnets 17 effects the swinging of the latches 15; and the clutch arms 12 then, released from restraint, swing under spring tension outward. The clutch is opened, and shaft 10 stops. The electro-magnets 17 in their turn, after performing their office, are at once de-energized by the continued turning of cylinder 5 and the breaking of the contact of brush 7 with strip 9.

The purpose of relay 19 is to prevent sparking, as the brush 7 makes contact successively with strips 8 and 9.

It will be perceived that with every rotation of the cylinder 5 the shaft 10 turns through a fraction of a complete rotation, and that the value of that fraction will be greater or less, according to the position of block 3 in its guideway 4 and according to the circumferential range of brush 7 upon the surface of cylinder 5 as the strips 8 and 9 pass beneath the brush. That range, as has been stated, is proportional to the variation in strength of the current flowing in circuit A B. The extent of rotation of shaft 10 then, within any given interval of time, is an expression of the quantity of electric energy (assuming constant voltage) which during that interval has passed through the circuit.

So, it will be apparent that, if a tally were driven directly by shaft 10, a suitable proportioning of parts would suffice to afford a correct reading of the aggregate of a variable (which variable in this case is amperage) and the tally, accordingly, would afford a reading of the quantity of electric energy which has passed (neglecting the change of voltage).

In this particular case, however, the accuracy of such a reading would be conditioned by the constancy of the potential under which the current flow continued. And if there be variation in potential, the quantity of energy passing will vary directly with it. I have perceived that, not only may I employ a device, the duplicate of that already described, to express in the angular extent of the turning of a shaft, the quantity of electric energy delivered under varying conditions of voltage (on the assumption that current strength is constant), but I have further perceived that if I mount upon the shaft 10 of the apparatus already described a second cylinder, and if with like instrumentalities I drive intermittently from such second cylinder a second shaft, and if I make the variable in the operation of such second set of instrumentalities responsive to variation in voltage in the line A B, I shall have, in the extent of the rotation of such second shaft, an expression of the quantity of electrical energy transmitted through the line under varying current strength, corrected for variation in voltage, as well as current. That is to say, I shall have a watt meter.

To this end, referring again to Figure I of the drawings, a second device, substantially identical with that already described, will be seen to be mounted upon the first. The cylinder 55 of this second device is integrally borne upon the driven shaft 10 of the first. The arm 22 of the second device is borne by the rotating armature of the motor 29, and motor 29 is so connected in the circuit A B, that variations in voltage express themselves in a turning of armature 28. The arrangement of the contact strips 88 and 99 upon the cylinder of the second device may be understood to be such that for each rotation of drum 55 the shaft 100 turns through an angle which varies in value, proportionately to the variation in voltage.

When the two devices are so organized the shaft 100 will turn through an angle whose value will be accurately indicative of the quantity of electric energy passing in the line A B, under conditions of variation both of current strength and of voltage. If then shaft 100 be caused to drive a tally 23, it is merely a matter of the proportioning of parts to obtain direct reading of watts.

It may be a matter of convenience to drive the motor for cylinder 5 electrically. I have described the motor 6 to be a piece of clockwork. Alternatively, it may be an electric motor, and in Figure I, I have diagrammatically indicated a circuit by which if the motor were indeed an electric motor, it might be driven.

I have said that the arrangement diagrammatically shown in Figure I is suitable for use in connection with a line carrying an alternating current. Should the line be a direct-current line, the instrument would be adapted for service merely by adapting the motors 26 and 29 in known manner to this changed condition.

The present invention has to do with refinements upon the instrument described. It is manifest on considering the drawings that the end of each arm, where it comes to approximate tangency to the cylinder with which it is organized, describes an arcuate path, and it is manifest that a contact piece if it were borne rigidly by the arm must be carried in an arcuate path. I provide a guideway, fragmentarily shown in the drawings and indicated at 4, in which the contact piece 3 may travel, the guideway being accurately parallel to the axis upon which the cylinder rotates. I slot the arm 2 longitudinally and cause the contact piece 3 to extend into the slot and yet provide for movability of the contact piece longitudinally of the slot. In consequence of this arrangement, as the arm swings, the contact piece is carried with it, but the contact piece in its movement travels not in an arcuate path, but in right-line course along guideway 4, and in a course which is accurately parallel to the axis of cylinder rotation. Thus I achieve the desirable result that in all positions of the contact piece the same relation is maintained, so far as concerns co-operation between the contact piece and the strip borne by the rotating cylinder. While it is true that the range of movement of the contact piece 3 along its guideway 4 will not throughout all the range of swing be exactly proportional to the angular movement of the arm 2, it remains possible, in the positioning of the strips 8 and 9 upon the cylinder 5, to make compensation for this lack of precise equation, and to bring it about that throughout all the range of swing the space interval at which the strips 8 and 9 stand apart is accurately proportional to the angle of swing of the arm, or, eliminating inaccuracy still further, the interval between the strips throughout all the range of swing be made accurately proportional to the value of the amperage.

It is advantageous that the cylinders 5 and 55 be arranged, as in the drawings they are shown, with their axes in vertical position, and that the arms 2 and 22 swing in vertical plane, and that the contact pieces move in vertically arranged guideways. In the casing 1, and conveniently upon the guideway 4, as shown, sheave 30 is mounted for idle turning, and over this sheave a line 31 is trained. This line at one end is secured to the arm 2, and at the other end it carries a weight 32. The weight 32 is so proportioned that the weight of the lever 2 is counterbalanced. Thus the inaccuracy in responsiveness of the arm to the varying amperage is eliminated and is not a disturbing factor in the accuracy of operation of the instrument. Like provision is made for the elimination of the factor of gravity in the operation of the arm 22 and its response to variation in voltage.

The wattmeter is an instrument in which the invention may to advantage be employed. It is manifest that the invention is not limited in its applicability to an instrument which measures, specifically, watts; it is manifest that it is applicable wherever, by instrumentalities such as those described, the value of a variable during successive periods of time is aggregated.

I claim as my invention:

1. In apparatus for aggregating the value of a variable during successive periods of time, a movable member, driving means for moving said member, a guideway arranged adjacent the movable member and extending transversely of the direction of movement of the said member, a contact piece movable upon said guideway, a slotted arm swinging upon a fulcrum and extending adjacent said guideway and in its slotted portion engaging said contact piece, whereby the said contact piece has movement longitudinally of said arm, means for swinging said arm in accordance with changes in value of said variable, an electrical circuit which includes said contact piece, a tally, means for uniting said movable member with said tally, and a contact piece on said movable member, which last-mentioned contact piece is included in said electrical circuit and is adapted to co-operate with the contact piece first named for effecting the actuation of said uniting means.

2. In apparatus for aggregating the value of a variable during successive intervals of time, a vertically extending movable member, driving means for moving said member, a vertically extending guideway arranged adjacent the movable member and extending transversely of the direction of movement of the said movable member, a contact piece movable upon said guideway, a slotted arm swinging upon a fulcrum and in vertical plane and extending adjacent said guideway and in its slotted portion engaging said contact piece, whereby the said contact piece has movement longitudinally of the said arm, a counterweight for said arm, means for swinging said arm in accordance with changes in value of said variable, an electrical circuit which includes said contact piece, a tally, means for uniting said movable member with said tally, and a contact piece on said movable member, which last-mentioned contact piece is included in said electrical circuit and is adapted to co-operate with the contact piece first named for effecting the actuation of said uniting means.

3. In measuring apparatus, means for aggregating the value of a variable through successive intervals of time, such means including a cylinder rotating on a vertical axis and equipped superficially with two contact strips arranged at an interval circumferentially of the cylinder which varies from point to point longitudinally of the cylinder, driving means for rotating the cylinder, a longitudinally slotted lever mounted on a fixed pivot and adapted to swing in vertical plane adjacent the cylinder, a vertically extending guideway arranged adjacent the cylinder, a contact piece movable upon said guideway and engaged by said lever and in the slotted portion thereof, a sheave rotatable upon a fixed axis, a cord trained upon the sheave engaging at one end the lever and carrying at the other end a counterweight, means for swinging said arm in accordance with changes in value of said variable, an electrical circuit which includes said contact piece, a tally, means for uniting said movable member with said tally, and a contact piece on said movable member, which last-mentioned contact piece is included in said electrical circuit and is adapted to co-operate with the contact piece first named for effecting the actuation of said uniting means.

4. In apparatus for aggregating the value of a variable, a movable member, driving means for moving said member, a guideway arranged adjacent the movable member and extending transversely of the direction of movement of said member, a contact piece movable on said guideway, an arm swinging upon a fulcrum and at its distal end being in engagement with said contact piece, said engagement admitting of relative movement of said contact piece longitudinally of said arm, means for swinging said arm in accordance with changes in value of said variable, an electrical circuit which includes said contact piece, a tally, means for uniting said movable member with said tally, and a contact piece on said movable member, which last-mentioned contact piece is included in said electrical circuit and is adapted to co-operate with the contact piece first named for effecting the actuation of said uniting means.

5. In apparatus for aggregating the value of a variable during successive periods of time, a rotatable cylinder, means for rotating said cylinder, a guideway arranged adjacent the cylinder and parallel to the axis thereof, a contact piece movable upon said guideway and means for moving said contact piece upon said guideway in response to variation in the value of such variable.

In testimony whereof I have hereunto set my hand.

ARCHER E. YOUNG.